United States Patent [19]

Massing

[11] 4,249,458
[45] Feb. 10, 1981

[54] PISTON AND EXTENSIBLE CYLINDER THEREFOR

[75] Inventor: Lyle E. Massing, South Bend, Ind.

[73] Assignee: The Bendix Corporation, Southfield, Mich.

[21] Appl. No.: 38,151

[22] Filed: May 11, 1979

Related U.S. Application Data

[62] Division of Ser. No. 826,606, Aug. 22, 1977.

[51] Int. Cl.² .................. F01B 31/14; F15B 15/24
[52] U.S. Cl. ........................... 92/13.1; 91/168;
   92/13.6; 92/51; 188/71.5; 188/351; 188/370
[58] Field of Search .............. 92/13, 13.1, 13.6, 51,
   92/52; 91/168, 189 R, 189 A; 192/111 A;
   188/71.5, 71.8, 72.4, 196 A, 351, 368, 369, 370

[56] References Cited

U.S. PATENT DOCUMENTS

| | | | |
|---|---|---|---|
| 837,416 | 12/1906 | Marsh | 91/168 |
| 1,174,788 | 3/1916 | Winn | 92/51 |
| 3,915,063 | 10/1975 | Ditlinger | 188/369 |
| 4,006,669 | 2/1977 | Price | 92/51 |

*Primary Examiner*—Abraham Hershkovitz

*Attorney, Agent, or Firm*—Leo H. McCormick, Jr.; Ken C. Decker

[57] ABSTRACT

A fluid pressure actuated piston of an aircraft multiple disc brake assembly is adapted to have an extended stroke by telescoping with a pressure actuated cylinder. The piston is slidably carried in a fluid pressure actuated cylinder which, in turn, is slidably carried in a fixed carrier. Initially, only the piston moves axially to extend its stroke with respect to the carrier. The cylinder's structure and axial position with respect to the carrier creates a fluid pressure responsive surface area initially sealed from the effects of the fluid pressure. Axial movement of the cylinder is initially resisted by either mechanical or differential pressure member until the stroke of the piston reaches a predetermined axial position to engage the cylinder. Continued extension of the piston's stroke urges the cylinder axially to break the fluid seal and expose the heretofore unaffected surface area of the cylinder to fluid pressure thereby extending the stroke of the cylinder a predetermined axial distance. The piston's maximum allowable stroke is thereby increased the same distance the cylinder travels. The output force of the piston is essentially unaffected by the force imposed on the cylinder necessary to overcome the fluid seal and once extended, the cylinder does not provide any work force area.

1 Claim, 5 Drawing Figures

PISTON AND EXTENSIBLE CYLINDER THEREFOR

This is a division of application Ser. No. 826,606, filed Aug. 22, 1977.

BACKGROUND OF THE INVENTION

The present invention relates to fluid pressure actuated force generating pistons having an extended range of travel. Reference is made to U.S. Pat. Nos. 3,789,738; 3,887,042; 3,915,063; 3,995,721; and 4,006,669, all of which are assigned to the assignee of of the present invention for generally similar type piston and extensible cylinder apparatus wherein the present invention is an improvement thereover.

Prior art arrangements which extend the axial travel of aircraft brake piston assemblies and thereby reduce the piston cavity depth have been somewhat complicated and consist of a number of small parts that pose problems in installation. The current development of aircraft brake assemblies utilizing carbon frictional material indicate that pistons with longer stroke will be necessary in order to realize minimum brake operating costs. It is not desirable to make longer axial length pistons because this would require an increase in the depth of the piston cavity. Increasing the depth of the piston cavity has practical problems due to the limited axial envelope for the brake assembly. Also, some prior art designs also affect the brake pressure "feel" to the aircraft pilot by increasing or decreasing the piston work force area.

SUMMARY OF THE INVENTION

The present invention provides a fluid pressure actuated piston with extended stroke and simple construction, has only two moving parts and requires only two extra fluid seals over conventional non-extending piston assemblies. The increased piston stoke is obtained by use of a floating cylinder liner that has a fluid pressure responsive surface area initially sealed from any pressurized fluid and is restrained in its initial position by either mechanical or differential pressure means. The cylinder remains in its initial position for approximately one half of the piston working stroke, at which point, the piston engages the cylinder to urge it axially as the piston extends its stroke. At a predetermined axial position, the restraining means on the cylinder is overcome thereby breaking the fluid seal and the heretofore protected surface area is exposed to the pressurized fluid which extends the cylinder to a predermined axial position. The cylinder's axial extension allows the piston to continue its extended stroke by moving a second time through the cylinder bore.

It is an object of the present invention to provide a structurally simple extensible piston assembly having few parts.

Another object of the present invention is to provide an extensible piston assembly that has the extensible cylinder moved to its extended position by the pressurized fluid and not by the piston.

Another object is to provide an extensible piston assembly that does not materially affect the brake "feel" to the aircraft pilot at either the transition point extending the cylinder or by changing the piston work force area.

A further object is to provide an extensible piston assembly which can be inserted into the cavity as an assembled unit.

DESCRIPTION OF THE PREFERRED EMBODIMENT

Figure 1:
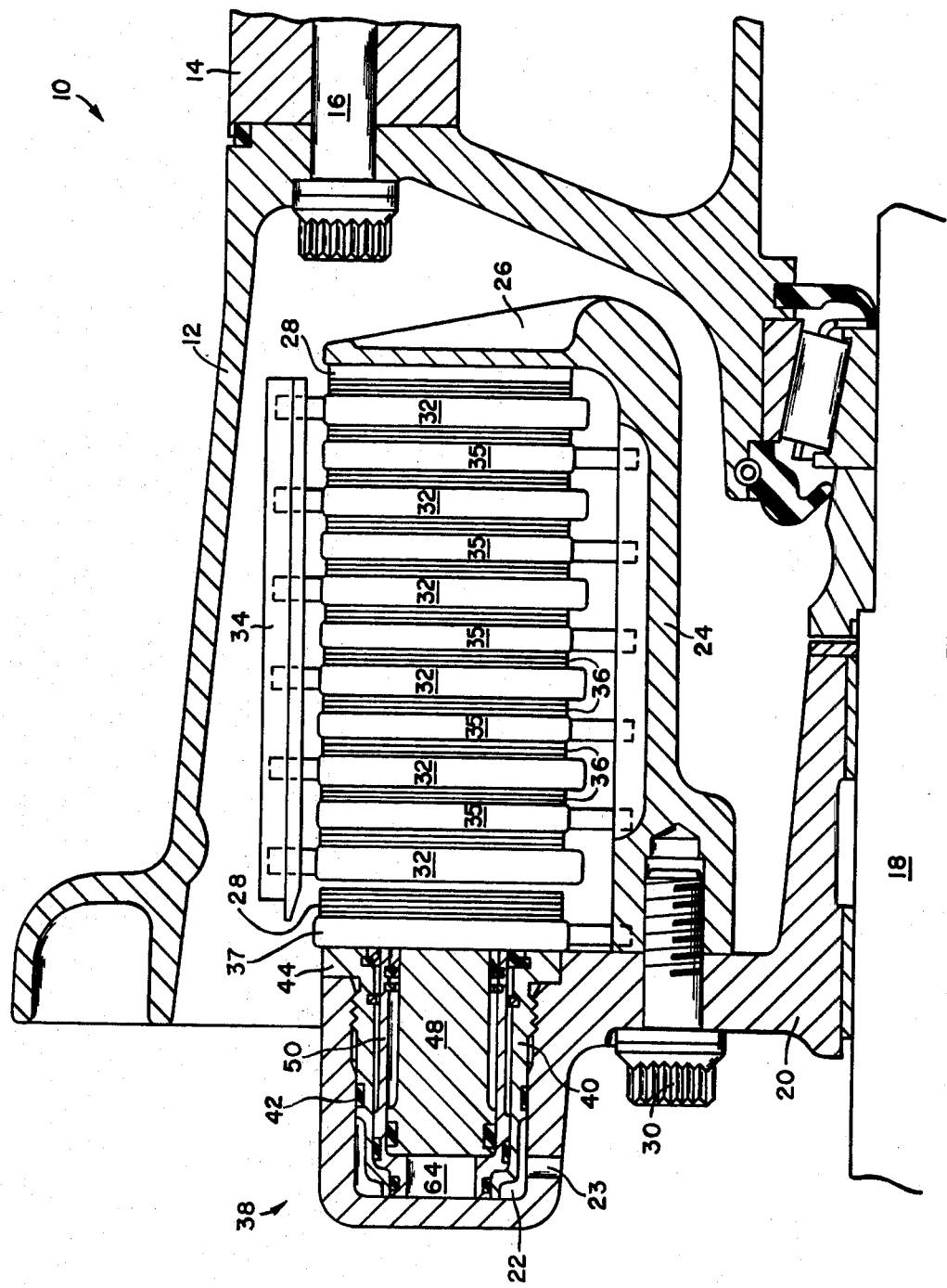
FIG. 1 is a sectional schematic representation of a conventional aircraft wheel and disc brake assembly containing one piston assembly embodiment of the present invention.

Referring to FIG. 1, numeral 10 designates an aircraft wheel and multiple disc brake assembly. The wheel of assembly 10 is defined by two annular sections 12 and 14, only one of which is fully shown, fastened together by circumferentially spaced-apart bolts and nuts generally indicated by 16. The wheel is suitably journaled on a rotatably fixed axle 18 carried by conventional aircraft landing gear structure, not shown. An annular brake carrier 20 suitably keyed to axle 18 is provided with a plurality of circumferentially spaced apart cavities 22, only one of which is shown, suitably vented via passage 23 to a source of pressurized fluid, not shown, controlled by the aircraft pilot. A torque tube 24 having an integral backing plate 26 suitably lined with friction material 28 is fixedly secured to carrier 20 by a plurality of circumferentially spaced-apart bolts 30. A plurality of spaced-apart annular brake rotor members 32 are suitably keyed to a plurality of retaining members 34, secured to wheel section 12, only one of which is shown, and adapted to permit axial movement of the rotor members 32 relative to wheel section 12. A plurality of annular brake stator members 35 having friction lining 36 secured to opposite faces thereof are suitably keyed for axial movement to torque tube 24. A pressure plate 37 suitably keyed for axial movement to torque tube 24, and, like backing plate 26, provided with friction lining 28, is adapted to be actuated by a plurality of piston means generally indicated by 38, disposed in cavities 22. Upon energization of the piston means 38, the pressure plate 37 is urged toward backing plate 26 thereby compressing the stacked stators and rotors 36 and 32 together to retard rotation of wheel sections 12 and 14.

Figure 2:
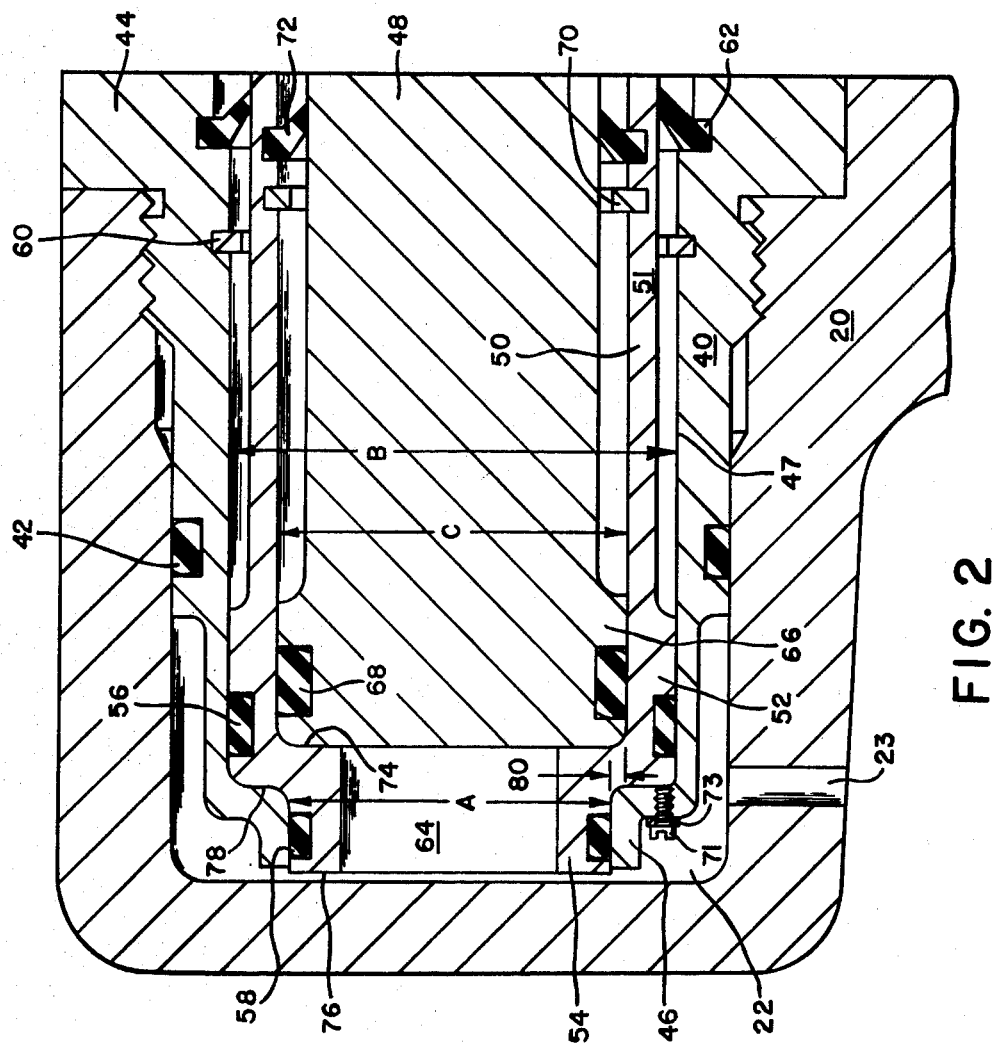
FIG. 2 is an enlarged view of the piston assembly embodiment depicted in FIG. 1, which embodiment includes a cylinder having a fluid pressure lock with some rearward surface area initially exposed to pressurized fluid.

One piston assembly embodying applicant's invention will now be described with reference to FIGS. 1 and 2. The cavities 22 have open and closed ends and are each provided with a sleeve 40 threadedly engaged with carrier 20 and provided with an annular recess containing an "O" ring or similar suitable fluid seal 42. Sleeve 40 also has a flange portion 44 adapted to be engaged by suitable wrench means, not shown, for assembly and disassembly purposes. For reasons described later, sleeve 40 has a cylindrical abutment portion 46 adapted to provide a smaller inside diameter "A" than the inside diameter "B" of the main portion 47 of sleeve 40. Also, the inside diameter "A" of abutment 46 must be smaller than the inside diameter "C" of cylinder 50.

Cylinder 50 has a body portion 51, a shoulder portion 52 and a cylindrical abutment portion 54. Shoulder 52 and abutment 54 are slidably received by main portion 47 and abutment 46 of sleeve 40, respectively. Because fluid pressure slidable engagements have, for all practical purposes, the engaged parts in continuous contact, diameters "A" and "B" will also be used to define the outside diameters of abutment 54 and shoulder 52, respectively. The operation of cylinder 50 requires two fluid pressure seals 56 and 58 contained in suitable annular recesses in shoulder 52 and abutment 54, respectively. The axial length of abutments 46 and 54 just need to be long enough to contain seal 58. Shoulder 52 is designed to extend outwardly beyond the body portion 51 and, as described hereinafter, acts as a stop to prevent further axial extension of cylinder 50 when shoulder 52 engages snap ring stop 60 held in sleeve 40. Conventional dust wiper seal 62 is secured in sleeve 40 and serves to prevent dirt or debris from entering the slidably engaged surfaces of the sleeve 40 and cylinder 50. The abutment portion 54 of cylinder 50 also has a fluid port 64 which communicates with port 23 to vent pressurized fluid to piston 48.

As mentioned before, the diameter "A" of abutment portion 54 is smaller than both the inside diameter "C" of cylinder 50 and the outside diameter "B" of shoulder portion 52 creating three differential fluid pressure surface areas 74, 76, and 78, on cylinder 50 upon which fluid pressure will act to either hold cylinder 50 in its initial, retracted position or to extend it axially toward the open end of the cavity.

Piston 48 has a shoulder portion 66 slidably contained inside cylinder 50. A fluid pressure seal 68 is contained in a suitable annular recess in shoulder portion 66. The shoulder portion 66 is adapted to act as a stop when engaged with snap ring stop 70 held in cylinder 50. The continued engagement of shoulder 66 and stop 70 acts to release cylinder 50 from its initial position as will be described later. Conventional dust wiper seal 72 is secured to cylinder 50 to prevent dirt or debris from entering the slidably engaged surfaces of piston 48 and cylinder 50.

It will be noted that the above described structure of piston means 38 is adapted to be assembled as a unit and subsequently positioned in cavity 22 by screwing sleeve 40 therein. To facilitate the assembly of cylinder 50 inside sleeve 40, screw 71 with seal 73 contained in sleeve 40, is removed in order to vent the air pressure developed when seals 56, 58 both engage their respective sealing surfaces of sleeve 40.

Figure 4:
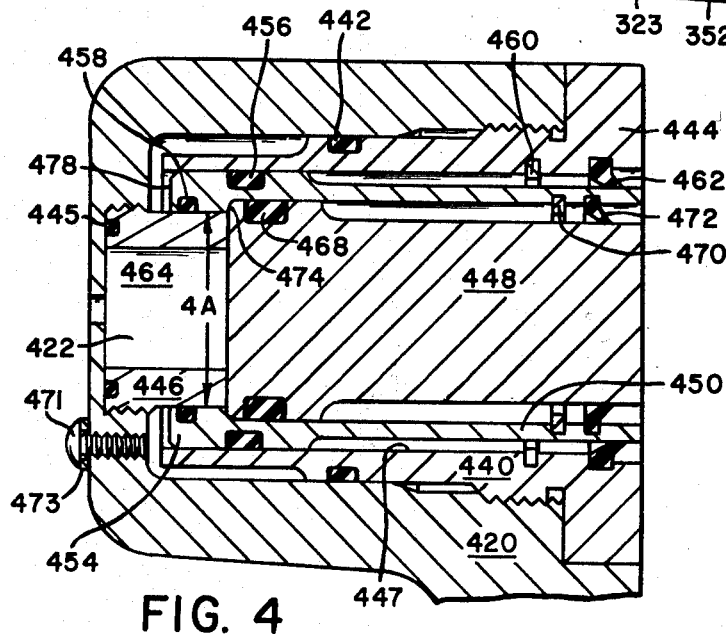
FIG. 4 is an enlarged view of a third piston assembly embodiment being a modification to the embodiment depicted in FIG. 3.

It is further noted that abutment portion 46 is shown integral with sleeve 40 to facilitate fluid entry from the side of cavity 22 as indicated at 23. However, as indicated in the embodiment of FIG. 4, it is possible to have abutment portion 46 as a separate member, like 446, secured to the carrier thereby requiring fluid entry through the closed end of cavity 22.

Assuming the brake apparatus embodying the present invention is in position as shown in FIG. 1, a brake application by the aircraft pilot results in pressurization of the fluid supplied to cavities 22 and subsequent equal pressurization of pistons 48 which move axially away from the abutment portions 54 of cylinders 50 thereby forcing pressure plate 37 toward backing plate 26 to compress rotor members 32 and stator members 35 together to produce the desired braking action of wheel sections 12 and 14.

Upon depressurization of pistons 48 to release the brake, the pressure plate 37 and thus pistons 48 bearing thereagainst are retracted under the influence of a plurality of brake adjusting and retraction units, not shown, connected to pressure plate 37 and carrier 20. Reference is made to U.S. Pat. No. 3,887,047 assigned to the assignee of the present application for an example of suitable adjusting and retraction units. It will be understood that the brake adjusting and retraction units, not shown, serve to automatically axially advance the pressure plate 37 to compensate for wear of the friction material 28 and 36 and retract the pressure plate 37 axially a predetermined distance to establish a corresponding predetermined brake running clearance upon release of the brake.

Assuming that repeated brake applications in the above-mentioned manner have occurred causing the friction material 28 and 36 to wear accordingly, the piston 48 will be required to advance axially to a progressively greater extent relative to the cylinder 50 to compensate for the brake wear. If the cylinder 50 was held in the retracted position shown, the stroke of piston 48 would be limited to the travel established by the distance between shoulder 66 and stop 70 which may be insufficient to compensate for remaining wear of the friction material 28 and 30. To extend the range of travel of piston 48, the present invention uses cylinder 50 which is adapted to travel the axial distance between shoulder 52 and stop 60 and thereby extending the possible stroke of piston 48 by that same amount.

The operation of cylinder 50 is controlled by the surface areas exposed to the effects of the pressurized fluid. Initially, cylinder 50 has two surfaces engaged with sleeve 40; abutment 54 received by abutment 46, and shoulder 52 received within main portion 47, thereby exposing only differential surface areas 74 and 76 to the pressurized fluid. Pressure seal 58 initially prevents fluid from reaching area 78. Upon a brake application cylinder 50 does not axially extend like piston 48 due to the slightly larger rearward force created by area 74 being slightly larger than area 76, due to diameter "C" being greater than diameter "A", as indicated at 80, thereby establishing a fluid pressure lock on the cylinder 50. The fluid pressure lock keeps cylinder 50 in its initial position until piston 48 extends its stroke the predetermined distance to engage shoulder 66 with stop 70. Once engaged, further pressurization of piston 48 acts to exert force upon stop 70 which is sufficient to overcome the aforementioned locking force thereby axially extending the stroke of cylinder 50 as the piston's stroke extends. Because the cylinder 50 is coupled to piston 48, the amount of stroke extension depends upon the wear of friction material 28, 36. When the stroke of cylinder 50 reaches a predetermined point, as determined by the axial lengths of abutments 46, 54, the fluid pressure seal 58 is pulled off of abutment 46 which breaks the fluid pressure lock and thereby exposing area 78 to the pressurized fluid. Once the lock is broken the combination of areas 76 and 78 being greater than area 74, diameter "B" greater than diameter "C", acts to allow the pressurized fluid to immediately extend the stroke of cylinder 50 until shoulder 52 engages stop 60. The fluid pressure retains the cylinder 50 in this extended position with shoulder 52 engaging stop 60 since the combination of areas 76 and 78 is larger than area 74.

The size of port 64 is immaterial for the operation of cylinder 50 but is shown large to reduce the total weight of the assembly. The locking force acting on cylinder 50, as determined by differential areas at 80, is designed to be large enough in order to withstand vibrations and the frictional pull by seal 68 as piston 48 extends its stroke but small enough so as to negligibly affect the total braking force exerted by piston 48. So as to not affect the brake feel to the aircraft pilot, the piston assembly of the present invention is designed to keep the cylinder 50 from ever pushing against pressure plate 37. This is accomplished by proper design of the distance between shoulder 66 and stop 70 and the distance between shoulder 52 and stop 60. As long as the former distance is greater than the latter, the cylinder will not apply force to the pressure plate 37. The cylinder 50 is used solely to extend the axial travel of piston 48.

Figure 5:
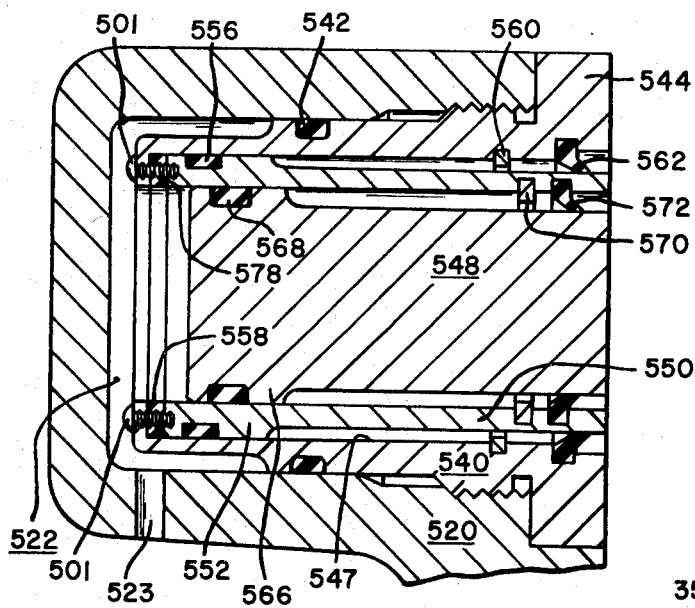
FIG. 5 is an enlarged view of a fourth piston assembly embodiment which includes a cylinder being mechanically restrained in its initial position.
Figure 3:
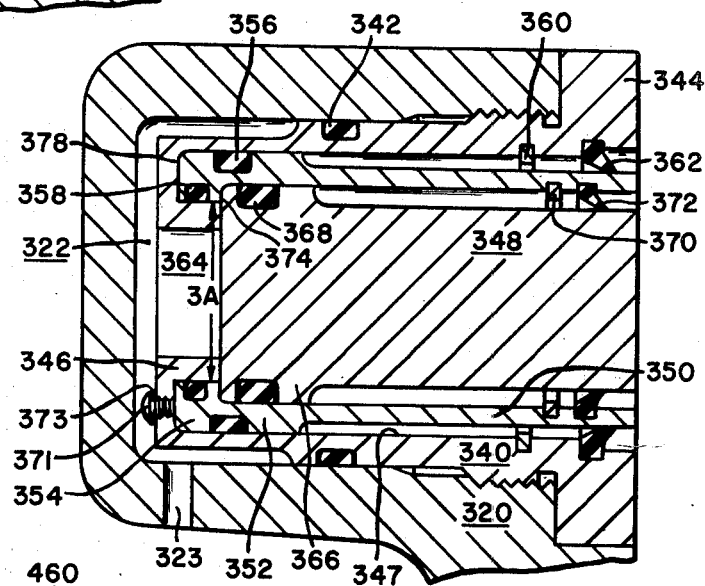
FIG. 3 is an enlarged view of another piston assembly embodiment which includes a cylinder having a fluid pressure lock without any rearward surface area initially exposed to pressurized fluid.

In order to indicate the scope of applicant's invention, three other embodiments are indicated in FIGS. 3, 4 and 5 wherein like parts are described by similar numerals with the addition of 300, 400, and 500, respectively. Referring now to FIG. 3, the embodiment contained therein is very similar to that disclosed in FIG. 2. The differences appear in the adaptation of abutments 346 and 354 wherein abutment 346 of sleeve 340 wraps around to the inside of abutment 354. The fluid pressure lock is created by seal 358 which appears on the inside of abutment 354 unlike the outside of abutment 54. Because abutment 346 wraps completely around abutment 354, only two fluid pressure responsive surface aeas 374, 378 appear on cylinder 350; there is no corresponding area 376. Annular area 374 is determined by diameter 3A which is sized to create the proper locking force and hereinbefore described. Like FIG. 2, the seal 358 is broken when abutment 354 is pulled off abutment 346 by piston 348. The embodiment of FIG. 3 can also be completely assembled outside of cavity 322.

The embodiment of FIG. 4 is similar to that of FIG. 3, but somewhat more complicated and is limited to a source of pressurized fluid being vented to cavity 422 through port 423 located at the closed axial end of cavity 422. The shape and operation of abutment 454, seal 458, areas 474, 478, and diameter 4A are all similar to their corresponding elements of FIG. 3, however, abutment 466 with seal 445 is secured to the carrier 420 and not sleeve 440 like abutment 346 and sleeve 340. This configuration of abutment 346 requires an assembly step inside cavity 422 and places vent screw 471 and seal 473 in carrier 420.

The last embodiment employing applicant's invention is shown in FIG. 5 and is different than the other embodiments because the restraining force on cylinder 550 is not created by a fluid pressure lock, but by mechanical force, shown using a plurality of angularly spaced-apart breakaway screws 501. Because this embodiment does not use fluid pressure restraining force created by surface areas as 74, 374, and 474, only the unexposed surface area 578 is necessary on cylinder 550. Annular fluid seal 558 is somewhat different than its counterparts but provides the same function. The screws 501 provide the restraining force necessary to make seal 558 effective under the vibrational forces and friction forces of seal 568 as piston 548 extends its stroke. In operation of cylinder 550, the screws 501 are designed to break in two pieces along their axial length in the area of seal 558 and thereby leave threaded portions in both sleeve 540 and cylinder 550 so that no small fragments can contaminate the fluid and do possible harm to either fluid seals 556 or 558. It is noted that this embodiment, like those of FIGS. 2 and 3, can be assembled outside of cavity 522.

The teachings of the present invention can be adapted to provide a series of telescoping cylinders to provide much more axial travel of the piston. It will be understood that applicant's invention as defined by the drawings and described in the specification are preferred embodiments and various structural changes and modifications therein may be made without departing from the scope of the invention as set forth in the following claims.

I claim:

1. In a fluid pressure actuated piston assembly with extended travel having a casing with an open end and a closed end defining a cavity therein, passage means for communicating fluid pressure into said cavity to actuate said piston assembly, a sleeve slidable within said cavity in response to said fluid pressure, a piston member slidable within said sleeve in response to said fluid pressure, and coupling means engageable with said piston member and said sleeve for coupling said sleeve to said piston member so that said sleeve moves with said piston member when said piston member moves more than a given axial distance relative to said sleeve and away from said closed end, said sleeve moving with said piston member to allow further axial movement of said piston member away from said closed end, the improvement wherein:

said sleeve includes a differential pressure responsive area responsive to said fluid pressure to prevent the movement of said sleeve away from said closed end until sleeve is coupled to said piston member;

said sleeve including a first area responsive to said fluid pressure to move said sleeve away from said closed end to an extending position wherein said sleeve engages a stop on said casing, said fluid pressure being prevented from communicating with said first area until said sleeve moves a predetermined distance away from said closed end, said sleeve being retained in said extended position by said fluid pressure;

said piston assembly including sealing means adapted to prevent communication of said fluid pressure with said first area until said sleeve moves said predetermined distance away from said closed end;

upon supply of fluid pressure, said fluid pressure acts upon said piston member and said differential area to move said piston member relative to said sleeve and away from said closed end until said piston member engages said coupling means;

whereupon said fluid pressure acts upon said piston member and overcomes said fluid pressure acting upon said differential area to move said piston member and said sleeve away from said closed end until said sleeve moves said predetermined distance away from said closed end;

whereupon said fluid pressure continues to act upon said piston member and said first area to overcome said fluid pressure acting upon said differential area and to further move said piston member and said sleeve away from said closed end to extend said piston assembly;

said sleeve including larger and smaller inside diameter portions, an end of said larger diameter portion defining said first area, said larger and smaller inside diameter portions cooperating to define a radial surface portion therebetween defining said differential pressure responsive area; and said casing includes a cylindrical member projecting into said cavity with an outer diameter portion, said sealing means being adapted to sealingly engage said outer diameter portion of said cylindrical member and said smaller inside diameter sleeve portion to prevent said fluid pressure from communicating with said first area until said sleeve moves said predetermined distance away from said closed end.

* * * * *